H. WILLARD.
Egg Carrier.
117496
Patented Jul 25 1871
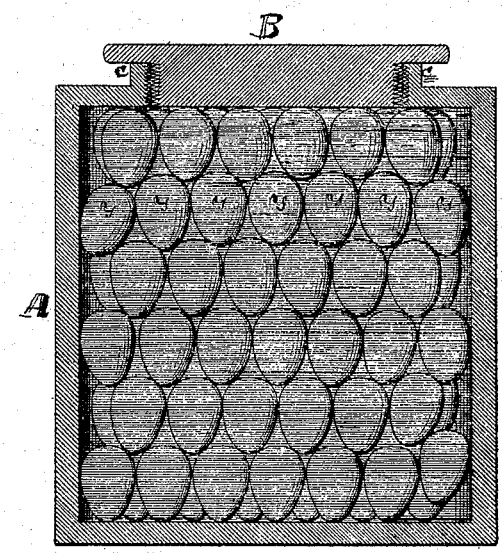
Witnesses.
Villette Anderson
Chas Kenyon
Inventor.
H. Willard
Chipman Hosmer & Co
Attorneys

UNITED STATES PATENT OFFICE.

HENDERSON WILLARD, OF GRAND RAPIDS, MICHIGAN.

IMPROVEMENT IN MODES OF TRANSPORTING EGGS.

Specification forming part of Letters Patent No. 117,496, dated July 25, 1871.

*To all whom it may concern:*

Be it known that I, HENDERSON WILLARD, of Grand Rapids, Michigan, have discovered a new and useful Packing for Eggs, Fruit, and other Articles for security against mechanical injury in transporting and handling; and I do declare that the following is a full and sufficient specification thereof, reference being had to the annexed drawing making a part of this specification and to the letters of reference marked thereon.

The drawing represents a vertical section of my egg-carrier.

My invention has relation to means for transporting eggs with safety; and consists in the construction of an air-tight receptacle with a removable and adjustable plug or stopper. In this vessel water is first admitted in a suitable quantity, and then eggs introduced in such numbers as to fill the vessel full of water and eggs conjointly.

A of the drawing represents a box, usually of cylindrical form, having an opening at its top, as shown. At the sides of and encircling this opening is an upright circular flange, c, with a screw-thread cut on the inside of its wall. B represents a plug or stopper having a screw-thread cut on the outer surface of its stem or shank, and adapted to fit in and work with the screw-thread upon flange c, as shown in the drawing. y represents eggs, and the shaded lines between and surrounding them represent water. The case or vessel A is made air-tight when the stopper is on duty, and said stopper is always screwed down to such a point as will displace sufficient water immediately below its shank to entirely fill the vessel.

The form herein described of the carrying-vessel may be changed to suit the taste or convenience of manufacturers, and other modifications of the openings and plug may be used; and other frail commodities may be transported in my carrier to advantage.

When a vessel is prepared and packed with eggs in the manner described breakage to such eggs is prevented, even in cases when the vessel is handled with roughness. This arises from the fact that certain hydrostatic laws are utilized in my invention, namely: First, water gives an even and uniform pressure upon the whole surface of any body immersed in it. Second, the effects of concussion upon water are evenly distributed over the whole surface of any body immersed in it. Third, all bodies whose specific gravity is but little greater than water will, when immersed, move upon each other and upon the sides of the vessel containing the water with but little pressure. It follows that, inasmuch as eggs have a specific gravity varying but little from that of water, my method of package for transportation secures to the operator the full benefit of the laws referred to in the premises.

I am aware that cranberries have been immersed in water and transported in that condition; but I am advised that such practice was adopted in order to prevent shrinkage of said berries and to preserve them in a plump condition for market.

I claim as my invention—

The vessel herein described, or its equivalent, when filled with water and eggs, for the purpose of transporting eggs without mechanical injury.

May 5, 1870.

HENDERSON WILLARD.

Witnesses:
BENJAMIN A. HARLAN,
FREDK. RAYNSFORD.